(12) United States Patent
Staude et al.

(10) Patent No.: US 10,921,875 B2
(45) Date of Patent: Feb. 16, 2021

(54) COMPUTER SYSTEM, OPERATIONAL METHOD FOR A MICROCONTROLLER, AND COMPUTER PROGRAM PRODUCT

(71) Applicant: Fujitsu Technology Solutions Intellectual Property GmbH, Munich (DE)

(72) Inventors: Rainer Staude, Munich (DE); Rudolf Häußermann, Munich (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 74 days.

(21) Appl. No.: 16/268,628

(22) Filed: Feb. 6, 2019

(65) Prior Publication Data
US 2019/0250685 A1    Aug. 15, 2019

(30) Foreign Application Priority Data
Feb. 14, 2018    (DE) ...................... 10 2018 103 286.2

(51) Int. Cl.
*G06F 1/32*    (2019.01)
*G06F 1/24*    (2006.01)
(Continued)

(52) U.S. Cl.
CPC .............. *G06F 1/3287* (2013.01); *G06F 1/24* (2013.01); *G06F 1/26* (2013.01); *G06F 1/3206* (2013.01)

(58) Field of Classification Search
CPC ........ G06F 1/3287; G06F 1/3206; G06F 1/24; G06F 1/26
See application file for complete search history.

(56) References Cited

U.S. PATENT DOCUMENTS 6,895,515 B1    5/2005 Yamazaki
7,774,633 B1 *  8/2010 Harrenstien .............. G06F 1/24
                                                            713/300
(Continued)

FOREIGN PATENT DOCUMENTS

DE    10 2015 100 855 B3    10/2015

OTHER PUBLICATIONS

Combined Search and Examination Report dated Jul. 16, 2019, of counterpart GB Application No. GB1900587.5.

*Primary Examiner* — Stefan Stoynov
(74) *Attorney, Agent, or Firm* — DLA Piper LLP (US)

(57) ABSTRACT

A computer system includes power supply providing at least one secondary supply voltage to generate operating voltage and a standby voltage; a system board with a plurality of system components arranged thereon; at least one sequencing microcontroller arranged on the system board for time-controlled provision of at least one of the operating voltage and the standby voltage to the plurality of system components; and at least one button that switches the computer system from a standby state to an operating state; wherein the sequencing microcontroller is configured, when the button is held for a first predefined time period indicating a forced switching of the computer system from the operating state to the standby state, to disconnect the plurality of system components from both the operating voltage and the standby voltage for a second predefined time period so that each of the plurality of system components is reset.

14 Claims, 3 Drawing Sheets

(51) Int. Cl.
*G06F 1/26* (2006.01)
*G06F 1/3287* (2019.01)
*G06F 1/3206* (2019.01)

(56) References Cited

U.S. PATENT DOCUMENTS

| | | |
|---|---|---|
| 8,892,859 B1 | 11/2014 | Eny |
| 9,411,704 B2 | 8/2016 | Häussermann et al. |
| 2003/0149867 A1 | 8/2003 | Park et al. |
| 2009/0282235 A1 | 11/2009 | Perng et al. |
| 2012/0159136 A1* | 6/2012 | Rothman .............. G06F 9/4401 713/2 |
| 2012/0198113 A1 | 8/2012 | Ziarnik et al. |
| 2015/0277931 A1 | 10/2015 | Staude et al. |

* cited by examiner

COMPUTER SYSTEM, OPERATIONAL METHOD FOR A MICROCONTROLLER, AND COMPUTER PROGRAM PRODUCT

TECHNICAL FIELD

This disclosure relates to a computer system comprising at least one power supply unit, at least one system board with a plurality of system components arranged thereon, at least one sequencing microcontroller arranged on the system board, and at least one button for switching the computer system from a standby state to an operating state. The disclosure furthermore relates to an operational method for a microcontroller of a computer system of this type, and a computer program product with program code for a microcontroller of this type.

BACKGROUND

Computer systems with a plurality of system components arranged on a system board, for example, a processor, a memory module, a chipset and different input/output controllers are known. To switch the components of computer systems of this type to a predefined basic state while providing operating power, it is furthermore known to supply the individual components with different supply voltages, in particular an operating voltage and/or a standby voltage, in a predefined temporal sequence. Due to the increasing degree of complexity of modern computer systems, generation and/or monitoring of a temporal sequence of this type is partially controlled or monitored by a dedicated microcontroller. Microcontrollers of this type are known, in particular, as "sequencing microcontrollers."

Computer systems with a sequencing microcontroller of this type are known, for example, from U.S. Pat. No. 9,411,704 B2 and US 2015/0277931 A1. According to U.S. Pat. No. 9,411,704 B2, the sequencing microcontroller is configured, in particular, to monitor the state of at least one control signal of a power supply unit and/or a system board to detect a failure of a primary supply voltage during the start-up of the computer system and signal such failure to a chipset. In this way, in particular, a basic state of the computer system can be prevented from being attained in the event of a supply voltage fault. According to US 2015/0277931 A1, the sequencing microcontroller is furthermore configured to detect a shutdown and successful restart of the system board, wherein, following detection of a shutdown of the system board, control signals are repeatedly transmitted to a chipset to restart the system board until a successful restart of the system board is detected. Inadvertent shutdown of computer systems intended for uninterrupted operation as a result of erroneous software requests or user requests can, in particular, be avoided in this way.

There is a further problem that computer systems of the aforementioned type cannot be reliably shut down or restarted in every case. In particular, severe exception conditions can sporadically occur in computer systems in which a restart of the computer system can no longer be triggered by software requests of the computer system, for example, by the operating system.

One possible way to safely reset the computer system consists of a physical disconnection of the computer system from a primary supply voltage, for example, by removing a mains plug. However, a procedure of this type is inconvenient for the user and not always possible in individual cases, for example, if a mains plug is not accessible or a power supply unit of the computer system is hardwired to a primary supply voltage, as, for example, in industrial computers.

It could therefore be helpful to provide a computer system that can be safely reset by a user from any operating state to a predefined basic state.

SUMMARY

We provide a computer system including at least one power supply unit that provides at least one secondary supply voltage to generate at least one operating voltage and a standby voltage; at least one system board with a plurality of system components of the computer system arranged thereon; at least one sequencing microcontroller arranged on the system board for time-controlled provision of at least one of the operating voltage and the standby voltage to the plurality of system components; and at least one button that switches the computer system from a standby state to an operating state, wherein the sequencing microcontroller is configured, when the button is held for a first predefined time period indicating a forced switching of the computer system from the operating state to the standby state, to disconnect the plurality of system components from both the operating voltage and the standby voltage for a second predefined time period so that each of the plurality of system components is reset.

We also provide a method of operating a microcontroller of a computer system for time-controlled provision of a standby voltage to a plurality of system components of the computer system connected to the microcontroller, including detecting at least one control signal indicating a forced switching of the computer system from an operating state to a standby state, following detection of the at least one control signal, disconnecting the plurality of system components from the standby voltage for a first predefined time period, and upon expiration of the first predefined time period, time-controlled provision of the standby voltage to at least one subgroup of the plurality of system components so that the computer system is reset to a predefined basic state.

We further provide a computer program including program code, wherein, when the program code is executed by a data processing unit of a microcontroller of a computer system, carries out the following steps: detecting at least one control signal indicating a forced switching of the computer system from an operating state to a standby state, following detection of the at least one control signal, disconnecting the plurality of system components of the computer system from a standby voltage for a first predefined time period, and upon expiration of the first predefined time period, time-controlled provision of the standby voltage to at least one subgroup of the plurality of system components so that the computer system is reset to a predefined basic state.

REFERENCE NUMBER LIST

Figure 1:
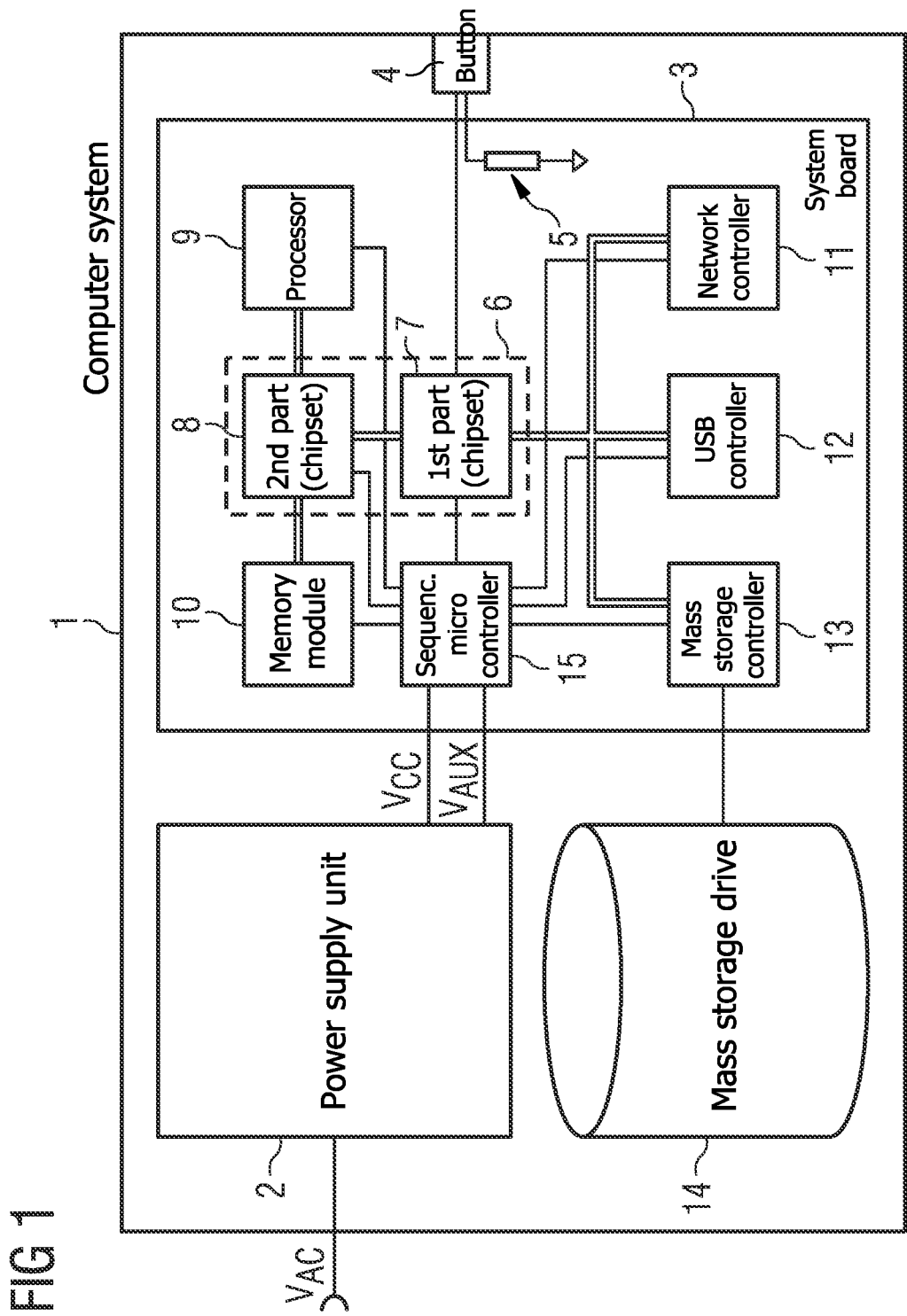
FIG. 1 shows a schematic representation of a computer system according to an example.

1 Computer system
2 Power supply unit

3 System board
4 Button
5 Circuit
6 Chipset
7 First part (of the chipset)
8 Second part (of the chipset)
9 Processor
10 Memory module
11 Network controller
12 USB controller
13 Mass storage controller
14 Mass storage drive
15 Sequencing microcontroller
20 Operational method
30 State diagram
E1 to E2 Event
S1 to S6 Step
Z1 to Z9 State
$V_{AC}$ Primary mains AC voltage
$V_{AUX}$ Standby voltage
$V_{CC}$ Operating voltage

DETAILED DESCRIPTION

Our computer system may comprise at least one power supply unit that provides at least one secondary supply voltage to generate at least one operating voltage and a standby voltage, at least one system board with a plurality of system components of the computer system arranged thereon, at least one sequencing microcontroller arranged on the system board for time-controlled provision of the operating voltage and/or the standby voltage to the plurality of system components, and at least one button to switch the computer system from a standby state to an operating state. When the button is held for a first predefined time period indicating a forced switching of the computer system from the operating state to the standby state, the sequencing microcontroller is configured to disconnect the plurality of system components from both the operating voltage and the standby voltage for a second predefined time period so that each of the plurality of system components is reset.

Such a computer system enables a reset of a computer system by at least one button, regardless of a state of a software program executed by the computer system and, in particular, a processor installed therein. Unlike "power button override," both a standby voltage and an operating voltage of all relevant system components of the computer system are disconnected so that the components are each reset to a basic state.

In at least one design, with the provision of the at least one secondary supply voltage by the power supply unit following a previous interruption of the at least one secondary supply voltage, the sequencing microcontroller is furthermore configured to supply the plurality of system components with the standby voltage in a predefined temporal sequence. The sequencing microcontroller is furthermore configured to supply at least one subgroup of the plurality of system components with the standby voltage in the predefined temporal sequence on expiration of the second predefined time period. It is thus ensured that the computer system is reset following a forced shutdown to precisely the same basic state which it also assumes following disconnection of the mains voltage or a temporary interruption of the standby voltage, for example, in a "deep sleep" state.

Actuation of the button may be monitored either by the sequencing controller itself or a part of a chipset which then forwards a corresponding control signal to the sequencing microcontroller for the forced shutdown.

The computer system may comprise at least one status register, wherein a first value is stored in the status register if the computer system is switched via a software request from the operating state to the standby state, and a second value is stored in the status register if the computer system is intended to be switched forcibly from the operating state to the standby state by holding the button for the first predefined time period. In this way, an event triggering a shutdown can also be stored during reinitialization of the computer system and can be taken into account by the sequencing microcontroller.

The sequencing microcontroller may be configured to supply the standby voltage without interruption to at least one predefined subgroup of the plurality of system components during the transition from the operating state to the standby state if the value stored in the status register indicates that the computer system has been switched via a software request from the operating state to the standby state. In this way, a standard compliant behavior of the computer system can be ensured if the computer system is switched to a standby state by a normal user request.

The system components of the computer system comprise, for example, a processor, one or more memory modules, a single-part or multi-part chipset, one or more mass storage controllers, USB controllers and/or network controllers. A part of the chipset, the USB controller and/or the network controller, for example, are supplied with the standby voltage in the standby state.

Our operational method is for a microcontroller of a computer system for the time-controlled provision of a standby voltage to a plurality of system components of the computer system connected to the microcontroller with the following steps:

detecting at least one control signal indicating a forced switching of the computer system from an operating state to a standby state, following detection of the at least one control signal, disconnecting the plurality of system components from the standby voltage for a predefined time period, and time-controlled provision of the standby voltage to at least one subgroup of the plurality of system components upon expiration of the predefined time period.

The above-mentioned method is suitable for switching a computer system to a basic state.

Our computer program product may comprise program code that performs all steps of the operational method during execution by a data processing unit of a microcontroller.

Our computer systems, operational methods and computer program products are described in detail below on the basis of examples with reference to the attached figures.

FIG. 1 shows a computer system 1 according to one example. The computer system 1 comprises a power supply unit 2 that converts a primary supply voltage, in particular a mains AC voltage $V_{AC}$, into a plurality of secondary supply voltages, in particular an operating voltage $V_{CC}$ and a standby voltage $V_{AUX}$. Alternatively, the power supply unit 2 can provide only a single secondary supply voltage to a system board 3 of the computer system 1, the supply voltage being converted by corresponding circuits of the system board 3 into the operating voltage $V_{CC}$ and the standby voltage $V_{AUX}$. The operating voltage $V_{CC}$ is supplied to most components of a computer system during a normal operating state, in particular the ACPI state S0. The standby voltage $V_{AUX}$ is typically made available not only during the normal operating state, but also during one or more energy-saving or standby states, in particular the ACPI state S5, to selected components required for reactivation of the computer system 1. These include, inter alia, components for a time-controlled wake-up or for a remote wake-up of the computer system, for example, via the "Wake-on-LAN" (WoL). The operating voltage $V_{CC}$ and the standby voltage $V_{AUX}$ may be identical, but are made available on the system board 3 via different supply lines. It is also possible to provide a plurality of identical operating voltages $V_{CC}$ and/or standby voltages $V_{AUX}$ either by the power supply unit 2 itself or via further voltage regulators on the system board 3.

The computer system 1 furthermore comprises a button 4 typically arranged in a position on a housing of the computer system 1 accessible to the user. In the example shown, the button 4 is connected via a cable connection to the system board 3 and is connected there to a circuit 5 and a part of a chipset 6. In the example, the button 4 is connected such that it connects a programmable control input of a first part 7 of the chipset 6 via a pulldown resistor having a predefined electrical potential, in particular the earth potential. Other circuits that monitor the actuation of the button 4 are also possible.

In the example shown, the system board 3 comprises a further, second part 8 of the chipset 6 connected via one or more data buses to a processor 9 and one or more memory modules 10. The system board 3 furthermore comprises a network controller 11, a USB controller 12 and a mass storage controller 13 that in turn connects to a mass storage drive 14. These components connect directly or indirectly via one or more data buses to the first part 7 of the chipset 6. The mode of operation and design of the components 2 to 14 essentially correspond to those of known standard components and are therefore not described in detail. Other system architectures and system components are also possible. In particular, a single-part chipset can be used instead of a multi-part chipset 6.

A sequencing microcontroller 15 is furthermore arranged on the system board 3 and supplied with both the standby voltage $V_{AUX}$ and the operating voltage $V_{CC}$, insofar as these are provided by the power supply unit. The sequencing microcontroller 15 furthermore connects to the components 7 to 13 of the system board and supplies them in a time-controlled manner with supply voltages necessary for a corresponding operating state of the computer system 1. To carry out this and further tasks, the sequencing microcontroller 15 is also connected if necessary via further control lines (not shown in FIG. 1) to the different components of the computer system 1, in particular the power supply unit 2, the first part 7 of the chipset 6 and/or the button 4.

As described in detail below, the sequencing microcontroller 15 is configured, in particular, to detect a user request for a "power button override cycle," i.e., actuation of the button 4 for a predefined time period of, for example, 3 s or longer. This detection may be performed directly by the sequencing microcontroller 15, i.e., monitoring the state of the button 4, or indirectly, i.e., monitoring a control signal provided by the chipset 6 in response to monitoring the state of the button 4. After detecting an event of this type, the sequencing controller 15 detects that the user desires a forced shutdown of the computer system, for example, because a major fault has occurred in the computer system 1. For the controlled reset of the components 7 to 13, the sequencing microcontroller 15 in this example interrupts the provision of both the operating voltage $V_{CC}$ and the standby voltage $V_{AUX}$ to the components 7 to 13.

Figure 2:
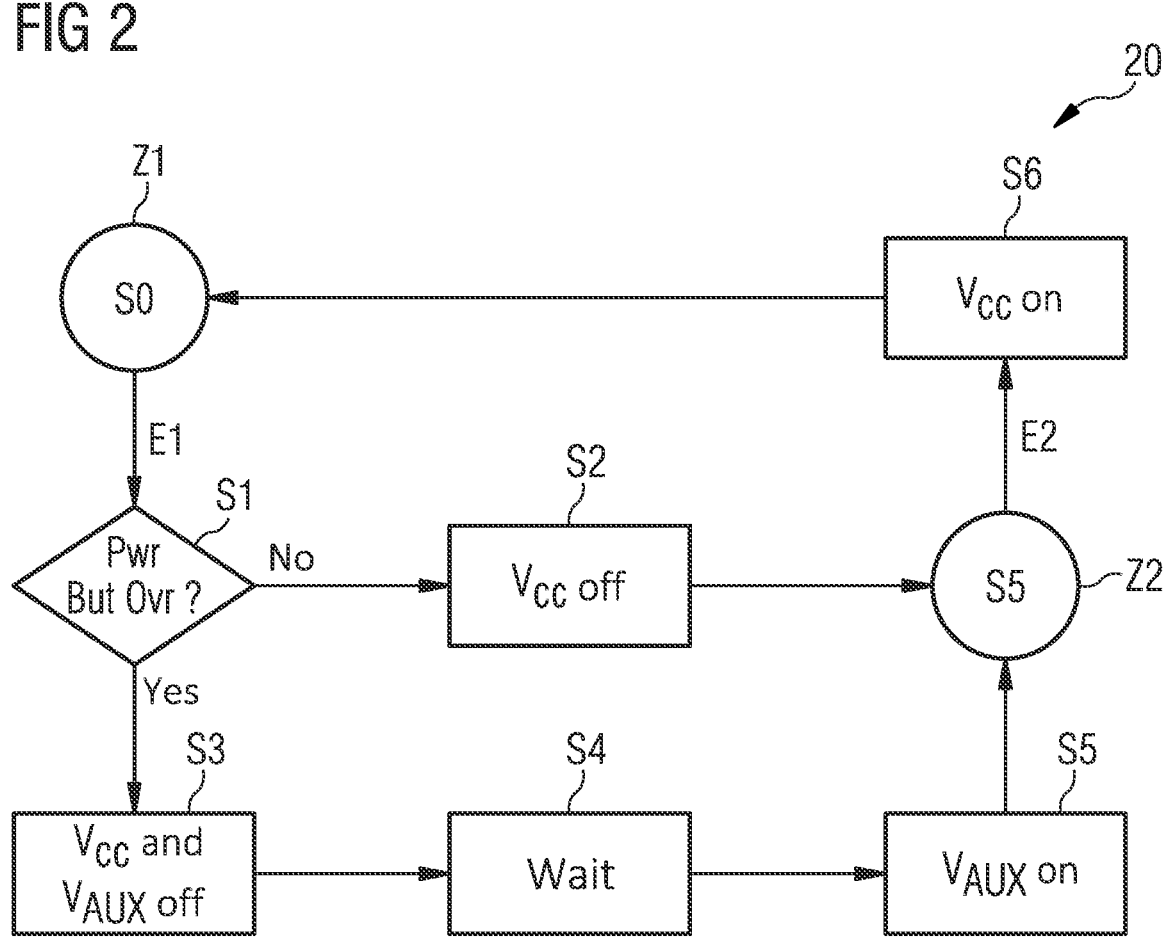
FIG. 2 shows a flow diagram of an operational method according to an example.

A method 20 of resetting a computer system, in particular the computer system 1 according to FIG. 1, is described below with reference to FIGS. 2 and 3, the method being executable even with the occurrence of severe exception conditions such as, for example, an operating system crash. It is assumed that the computer system 1 is initially in a normal, activated operating state Z1, for example, the ACPI state S0, and intended to be switched forcibly from the state to a standby state Z2, for example, the ACPI state S5. The operating state Z1 merely entails the description of an electrical state. As already indicated above, the computer system 1 may well be in an exception condition in which a correct execution of an application or an operating system is no longer guaranteed.

In the state Z1, a shutdown of the computer system 1 is requested by a first event E1. An event E1 of this type may, for example, be a software request in the normal operation of the computer system 1 or an actuation of the button 4 by a user. The latter is shown in the state diagram 30 according to FIG. 3. In this example, it is furthermore decided whether the button 4 is only briefly actuated or pressed over a predefined, longer time period. For this purpose, when the button 4 is depressed, the computer system 1 initially switches to an intermediate state Z3 corresponding to the depressed state of the button 4. When the button 4 is released, the computer system 1 normally switches back to the state Z1 or, if the button 4 has been actuated for a time period of more than 3500 ms, to a further state Z4.

The chipset 6 normally initiates a shutdown if the button 4 is pressed for a longer time. This time is programmable and is at least 4 s or longer. The sequencing microcontroller 15 waits in the state Z4, if the button 4 has been pressed for longer than 3500 ms, for the shutdown of the computer 1 by the chipset 6. A shutdown of this type is indicated at the hardware level through activation of the "sleep" signal. However, if the button 4 has not been pressed for long enough to trigger the power button override cycle in the chipset 6, i.e., for a time period longer than 3500 ms, but shorter than the pre-programmed time period of the chipset, the system switches from the state Z4 back to the state Z1.

If the button 4 has been pressed for long enough to force the power button override cycle and the chipset then activates the "sleep" signal, the system switches from the state Z4 to a further intermediate state Z5 in which a corresponding value is stored in a status register of the sequencing microcontroller 15, indicating that the button 4 has been pressed for longer than a first predefined time period to force a mandatory shutdown of the computer system. The computer system then switches again immediately from this state Z5 to a shutdown state Z6 in which the sequencing microcontroller 15 defines the further measures for shutting down the computer system 1.

Figure 3:
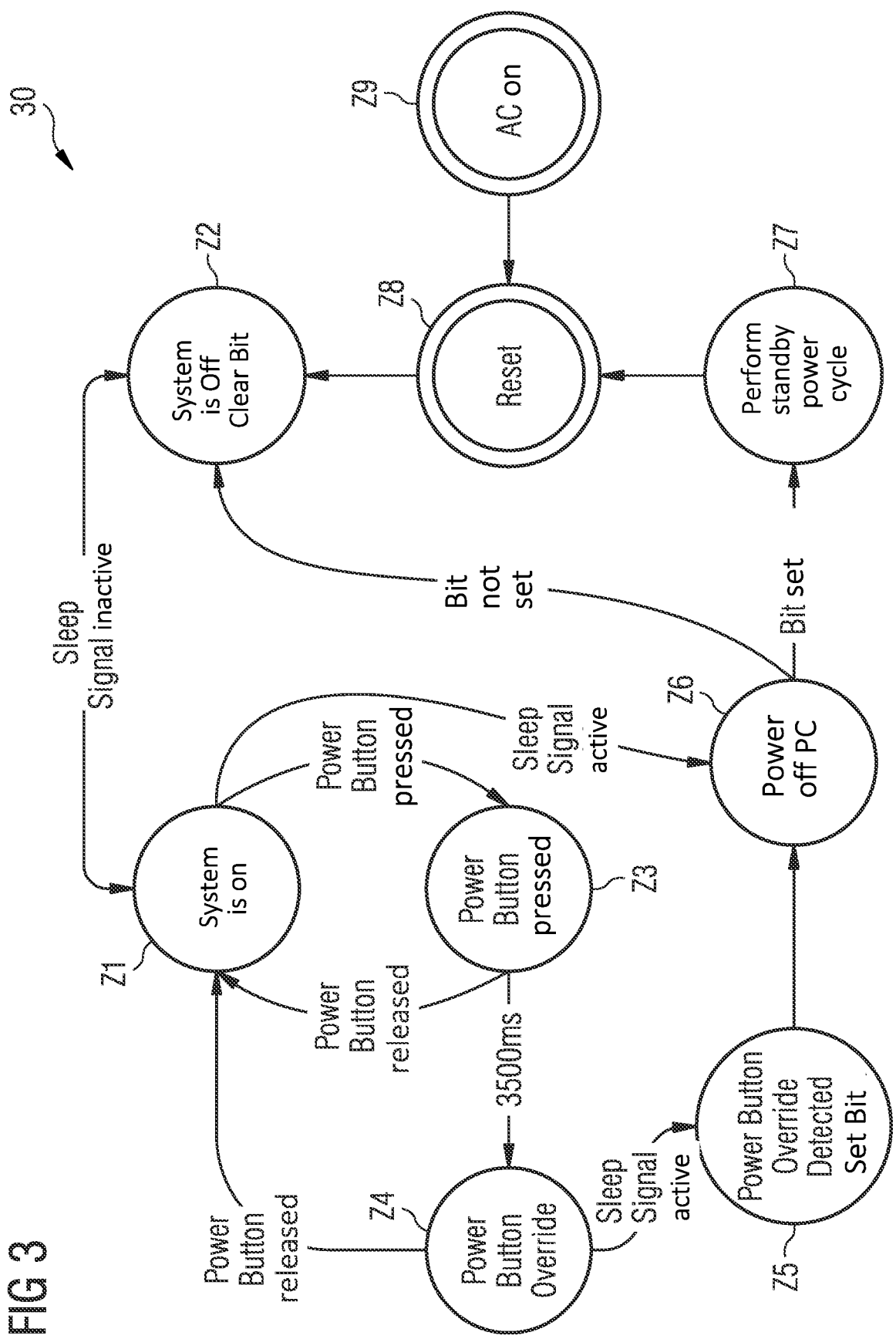
FIG. 3 shows a state diagram of a computer system according to an example.

Alternatively, i.e., if the button 4 has been actuated for a time period shorter than the first predefined time period, the actuation of the button 4 can optionally be forwarded in the state Z1 to a software component which, as shown in FIG. 3, then generates the "sleep" control signal to similarly switch to the shutdown state Z6. This "normal" shutdown by software or a short press of the button 4 is shown in the state diagram 30 by the switch from Z1 to Z6.

The different intermediate states and associated requests are shown in simplified form in the flow diagram according to FIG. 3 as decision step S1 in which a check is carried out to determine whether the shutdown event of E1 corresponds to a power button override request or a normal shutdown request. If a normal shutdown is involved, for example, due to triggering of a software request within a user interface of an operating system or brief actuation of the button 4, the computer system 1 is shut down under software control.

Only the supply voltage $V_{CC}$ is then deactivated in a step S2, for example, to disconnect the processor 9, the memory 10 and the mass storage drive 13 from the operating voltage and thus significantly reduce the energy consumption of the computer system 1. Conversely, if a forced switching of the computer system 1 from the operating state Z1 to the standby state Z2 is involved, provision of both the supply voltage $V_{CC}$ and the standby voltage $V_{AUX}$ is interrupted in a step S3 for all system components 7 to 13 by the sequencing microcontroller 15 under hardware control.

The states assumed during these two shutdown types are shown in detail in FIG. 3. In a normal shutdown procedure, the computer system 1 switches directly from state Z6 to state Z2 in which only selected components are supplied with the standby voltage $V_{AUX}$. In a forced shutdown, the computer system initially switches to the state Z7 in which the supply voltages $V_{CC}$ and $V_{AUX}$ of all system components 7 to 13 controlled by the sequencing microcontroller 15 are interrupted, and in which the sequencing microcontroller 15 remains for a second predefined time period. This is shown as step S4 in the flow diagram according to FIG. 2. For example, it waits for a time period of 1 s so that all system components 7 to 13 of the system board 3 are safely reset.

The computer system 1 then switches to a reset state Z8 in which the sequencing microcontroller performs a predefined sequence to restart the system board 3 in step S5. In the example, this sequence corresponds to the same sequence also performed after the first connection of the computer system 1 to the primary mains voltage $V_{AC}$ in state Z9. The first part 7 of the chipset 6 and the network controller 11, for example, are first supplied with the standby voltage $V_{AUX}$ so that the network controller can detect and process a subsequent activation request. As part of this initialization sequence, firmware can also load configuration values required by the individual system components and are stored, for example, in a non-volatile memory module, and can thus reset the computer system 1 to a basic state defined by the firmware. Configuration values of this type such as, for example, wake-up values would not be reset in a normal shutdown of the computer system 1 so that, in a previous system software crash, the computer system 1 would possibly be in an unknown state.

Following the performance of this initialization sequence, the computer system is thus in a predefined basic state Z2, in particular the ACPI state S5. Once this state Z2 is attained, the possibly previously set value of the control register is reset to indicate a forced shutdown. From the shutdown state Z2, the computer system 1 can again be switched to the normal operating state Z1 by a further event E2. For example, the operating voltage $V_{CC}$ can be supplied once more to all components of the computer system 1 in response to a further actuation of the button 4 in a step S6.

The described computer system 1 and the method 20 offer the advantage that they enable a safe reset of the computer system 1 without additional hardware requirements. In particular, only a reprogramming of a non-volatile memory of a typically already present sequencing microcontroller 15 with program code for execution by a computing unit of the microcontroller 15 is required to carry out the operational method 20 according to FIG. 2. This enables a particularly low-cost and, where appropriate, subsequent upgrading of a computer system 1 with the described function for the safe reset of the computer system 1.

The invention claimed is:

1. A computer system comprising:
   at least one power supply unit that converts a primary supply voltage into at least one secondary supply voltage and that provides the at least one secondary supply voltage to generate at least one operating voltage and a standby voltage;
   at least one system board with a plurality of system components of the computer system arranged thereon;
   at least one chipset arranged on the system board,
   at least one sequencing microcontroller arranged on the system board for time-controlled provision of at least one of the operating voltage and the standby voltage to the plurality of system components; and
   at least one button that switches the computer system from a standby state to an operating state;
   wherein the sequencing microcontroller is configured, when the button is held for a first predefined time period indicating a forced switching of the computer system from the operating state to the standby state, and when a control signal is activated by the chipset after the first predefined time period has elapsed and before the button is released, the control signal indicating that the computer system is switched off, to disconnect the plurality of system components from both the operating voltage and the standby voltage for a second predefined time period so that each of the plurality of system components is reset.

2. The computer system according to claim 1, wherein, with the provision of the at least one secondary supply voltage by the power supply unit following a previous interruption of the at least one secondary supply voltage, the sequencing microcontroller is configured to supply at least one subgroup of the plurality of system components with the standby voltage in a predefined temporal sequence, and is furthermore configured to supply the at least one subgroup of the plurality of system components with the standby voltage in the predefined temporal sequence upon expiration of the second predefined time period so that the computer system is reset to a predefined basic state.

3. The computer system according to claim 1, wherein the sequencing microcontroller is connected via at least one control line to the button and configured to monitor the switching state of the button via the control line and detect the holding of the button for the first predefined time period.

4. The computer system according to claim 3, wherein at least a part of the chipset is connected via the at least one control line to the button and configured to monitor the switching state of the button via the control line and detect the holding of the button for the first predefined time period.

5. The computer system according to claim 1, further comprising at least one chipset, wherein at least a part of the chipset is connected via at least a first control line to the button and via at least a second control line to the sequencing microcontroller and configured to monitor the switching state of the button via the first control line, detect holding of the button for the first predefined time period and signal the forced switching of the computer system from the operating state to the standby state via the second control line to the sequencing microcontroller.

6. The computer system according to claim 1, further comprising at least one status register, wherein a first value is stored in the status register if the computer system is switched via a software request from the operating state to the standby state, and a second value is stored in the status register if the computer system is intended to be switched forcibly from the operating state to the standby state by holding the button for the first predefined time period.

7. The computer system according to claim 6, wherein the at least one status register is comprised in at least one of a part of a chipset or the sequencing microcontroller.

8. The computer system according to claim 6, wherein the sequencing microcontroller is configured to supply the standby voltage without interruption to at least one predefined subgroup of the plurality of system components during a transition from the operating state to the standby state if the value stored in the status register indicates that the computer system has been switched via a software request from the operating state to the standby state.

9. The computer system according to claim 1, wherein the plurality of system components comprises at least two of: a processor; a memory module; the chipset; a mass storage controller; a USB controller; and a network controller.

10. The computer system according to claim 9, wherein at least one of the following system components is supplied with the standby voltage in the standby state: at least a part of the chipset, the USB controller, and the network controller.

11. A method of operating a sequencing microcontroller of a computer system for time-controlled provision of a standby voltage to a plurality of system components of the computer system connected to the sequencing microcontroller, comprising:

monitoring a button of the computer system for actuation and changing to a first state when the button is held for a first predefined time period indicating a forced switching of the computer system from an operating state to a standby state, waiting in the first state before releasing the button for a control signal activated by a chipset of the computer system, the control signal indicating that the computer system is switched off, following detection of the control signal in the first state, changing to a shutdown state and disconnecting the plurality of system components from the standby voltage for a second predefined time period, and upon expiration of the second predefined time period, time-controlled provision of the standby voltage to at least one subgroup of the plurality of system components so that the computer system is reset to a predefined basic state.

12. The method according to claim 11, wherein the sequencing microcontroller is connected via at least one control line to the button for monitoring the switching state of the button via the control line and for detecting holding of the button for the first predefined time period indicating the forced switching of the computer system from the operating state to the standby state.

13. A computer program product embodied on a non-transitory computer-readable medium comprising program code executable within a data processing unit, wherein, when the program code is executed by a data processing unit of a sequencing microcontroller of a computer system, carries out the following steps:

monitoring a button of the computer system for actuation and changing to a first state when the button is held for a first predefined time period indicating a forced switching of the computer system from an operating state to a standby state, waiting in the first state before releasing the button for a control signal activated by a chipset of the computer system, the control signal indicating that the computer system is switched off, following detection of the control signal in the first state, changing to a shutdown state and disconnecting the plurality of system components of the computer system from a standby voltage for a second predefined time period, and upon expiration of the second predefined time period, time-controlled provision of the standby voltage to at least one subgroup of the plurality of system components so that the computer system is reset to a predefined basic state.

14. The computer program product according to claim 13, wherein the sequencing microcontroller is connected via at least one control line to the button for monitoring the switching state of the button via the control line and for detecting holding of the button for the first predefined time period indicating the forced switching of the computer system from the operating state to the standby state.

* * * * *